(12) United States Patent
Alexanian et al.

(10) Patent No.: US 11,349,220 B2
(45) Date of Patent: May 31, 2022

(54) OSCILLATING WAVEGUIDES AND RELATED SENSOR ASSEMBLIES

(71) Applicant: VEONEER US, INC., Southfield, MI (US)

(72) Inventors: Angelos Alexanian, Lexington, MA (US); Konstantinos Konstantinidis, Wurzburg (DE); Arnold Mobius, North Chelmsford, MA (US)

(73) Assignee: Veoneer US, Inc., Southfield, MI (US)

( * ) Notice: Subject to any disclaimer, the term of this patent is extended or adjusted under 35 U.S.C. 154(b) by 175 days.

(21) Appl. No.: 16/789,372

(22) Filed: Feb. 12, 2020

(65) Prior Publication Data

US 2021/0249777 A1    Aug. 12, 2021

(51) Int. Cl.
*H01Q 13/22* (2006.01)
*G01S 7/03* (2006.01)

(52) U.S. Cl.
CPC ............ *H01Q 13/22* (2013.01); *G01S 7/032* (2013.01)

(58) Field of Classification Search
CPC .. H01Q 13/16; H01Q 13/0233; H01Q 1/3233; H01Q 21/0043; H01Q 13/22; G01S 7/032; G01S 13/931; G01S 7/03
See application file for complete search history.

(56) References Cited

U.S. PATENT DOCUMENTS

| | | | |
|---|---|---|---|
| 2,648,000 A * | 8/1953 | White | H01Q 3/32 343/791 |
| 2,990,547 A | 6/1961 | McDougal | |
| 3,231,894 A | 1/1966 | Nagai | |
| 6,483,481 B1 | 11/2002 | Sievenpiper et al. | |
| 7,132,905 B2 | 11/2006 | Sano | |
| 8,058,998 B2 * | 11/2011 | Burnside | H01Q 1/2216 340/572.7 |
| 8,779,995 B2 | 7/2014 | Kirino et al. | |

(Continued)

FOREIGN PATENT DOCUMENTS

| | | |
|---|---|---|
| CN | 102931492 | 2/2015 |
| CN | 105633585 A * | 6/2016 |

(Continued)

OTHER PUBLICATIONS

CN102931492, Feb. 11, 2015, Beijing Institute of Telemetry Technology, Machine Translation (9 pages).

(Continued)

*Primary Examiner* — Olumide Ajibade Akonai
*Assistant Examiner* — Alexander L. Syrkin
(74) *Attorney, Agent, or Firm* — Matthew D. Thayne; Thayne and Davis LLC

(57) ABSTRACT

Waveguide and/or antenna structures for use in RADAR sensor assemblies and the like. In some embodiments, the assembly may comprise a waveguide groove extending along an elongated axis. An antenna structure may be operably coupled with the waveguide groove and may comprise one or more slots extending within the waveguide groove along the elongated axis. The antenna structure may be positioned and configured to deliver electromagnetic radiation from the waveguide groove therethrough. The waveguide groove and/or the slot(s) of the antenna structure may intermittently oscillate on opposite sides of the elongated axis, in some embodiments in a periodic manner, along at least a portion of the elongated axis.

22 Claims, 9 Drawing Sheets

(56) References Cited

U.S. PATENT DOCUMENTS

| | | |
|---|---|---|
| 8,803,638 B2 | 8/2014 | Kildal |
| 9,153,851 B2 | 10/2015 | Nakamura |
| 9,252,475 B2 | 2/2016 | Milyakh et al. |
| 9,666,931 B2 | 5/2017 | Suzuki |
| 10,090,600 B2 * | 10/2018 | Kirino ................ H01Q 13/24 |
| 10,164,344 B2 | 12/2018 | Kirino et al. |
| 11,171,399 B2 * | 11/2021 | Alexanian ............ G01S 3/40 |
| 2009/0153432 A1 * | 6/2009 | Manasson ............ H01Q 13/28 343/876 |
| 2009/0322611 A1 * | 12/2009 | Manasson ............ H01Q 3/44 342/372 |
| 2011/0050356 A1 | 3/2011 | Nakamura et al. |
| 2012/0056794 A1 * | 3/2012 | Manasson ............ H01Q 13/28 343/785 |
| 2013/0141271 A1 * | 6/2013 | Mobius ................ H01Q 1/32 342/175 |
| 2014/0354498 A1 | 12/2014 | Balma et al. |
| 2016/0020522 A1 | 1/2016 | Sano et al. |
| 2017/0187121 A1 | 6/2017 | Kirino et al. |
| 2017/0279193 A1 * | 9/2017 | Chauloux ............ H01Q 1/22 |
| 2018/0269591 A1 | 9/2018 | Kirino et al. |
| 2018/0301820 A1 * | 10/2018 | Bregman ............ H01Q 13/10 |
| 2018/0351261 A1 | 12/2018 | Kamo et al. |
| 2021/0028549 A1 * | 1/2021 | Doyle ................ H01Q 13/18 |

FOREIGN PATENT DOCUMENTS

| | | | |
|---|---|---|---|
| CN | 106207357 | 12/2016 | |
| WO | 2019022651 | 1/2019 | |
| WO | WO-2019211908 A1 * | 11/2019 | ........... H01Q 21/005 |

OTHER PUBLICATIONS

CN106207357, Dec. 7, 2016, Chengdu Xanaway Technology Co., Ltd., Machine Translation (58 pages).

Goussetis, G. et al., Tailoring the AMC and EBG characteristics of periodic metallic arrays printed on grounded dielectric substrate, IEE Transactions on Antennas and Propagation, vol. 51, No. 1, Jan. 2006 (10 pages).

PCT/US2021/017725, International Search Report, dated Apr. 23, 2021 (2 pgs).

PCT/US2021/017725, Written Opinion, dated Apr. 23, 2021 (8 pgs).

* cited by examiner

OSCILLATING WAVEGUIDES AND RELATED SENSOR ASSEMBLIES

SUMMARY

Disclosed herein are various embodiments of waveguide and/or antenna structures. In preferred embodiments, such structures may be used in sensor assemblies, such as RADAR or other sensor modules for vehicles.

For example, in some embodiments disclosed herein, a waveguide and/or antenna block, which may comprise a casting having waveguide structures formed therein, may be provided having oscillating waveguide and/or antenna structures.

In a more particular example of a waveguide assembly, such as a waveguide assembly for a vehicle sensor module, the waveguide assembly may comprise one or more waveguide grooves each extending along an elongated axis. An antenna structure, such as one or more slots extending within and/or positioned adjacent to each of the waveguide grooves, may be operably coupled with the waveguide groove(s) and may comprise a continuous, elongated slot extending within each waveguide groove along its elongated axis. The antenna structure may be positioned and configured to deliver electromagnetic radiation from the waveguide groove therethrough. One or both of the waveguide groove and the continuous, elongated slot of the antenna structure may intermittently oscillate on opposite sides of the elongated axis along at least a portion of the elongated axis. In some embodiments, this oscillation may be in a periodic manner. Alternatively, the oscillation may be quasi-periodic or random. The oscillation of a waveguide groove may be provided, for example, by oscillating the waveguide groove walls themselves and/or by positioning obstacles or protruding members within the waveguide groove.

In embodiments in which the waveguide groove oscillates, the oscillation may comprise, for example, smoothly curving sidewalls of the groove, sharply or abruptly shifting sidewalls, and/or various protruding members or obstacles that may extend from the sidewalls, adjacent to the sidewalls, and/or otherwise positioned within the groove to mimic the effect of curving sidewalls. Thus, in some embodiments, the sidewalls of the groove may be straight but may be effectively viewed as curved/oscillating by the presence of such protruding members therein.

In some embodiments, the waveguide groove and/or the continuous, elongated slot of the antenna structure may intermittently oscillate on opposite sides of the elongated axis in a pattern that smoothly curves between opposite sides of the elongated axis, such as in a sinusoidal or at least substantially sinusoidal pattern.

In some embodiments, the antenna structure may comprise a single, elongated slot that extends in a straight line, or at least substantially a straight line, along the elongated axis within the waveguide groove.

In some embodiments, the single, elongated slot may be centered, or at least substantially centered, with respect to the waveguide groove.

An amplitude of a periodic pattern defined by the waveguide groove may taper or otherwise change along the elongated axis in some embodiments.

In some embodiments, the waveguide assembly may comprise a waveguide block, such as, for example, a casting, which may have the waveguide groove formed therein. In some such embodiments, the continuous, elongated slot may also be formed in the waveguide block.

In some embodiments, the waveguide groove may comprise a point along the waveguide groove, which in some such embodiments may be at, or at least substantially at, a center of the waveguide groove measured along a longitudinal axis thereof, such that the waveguide groove defines a shape having reflectional symmetry along the longitudinal axis about the point. In some embodiments, the point may comprise a point of discontinuity and/or may comprise a sharp point of discontinuity if desired.

In an example of an antenna module, such as a vehicle RADAR module, according to some embodiments, the antenna module may comprise an antenna block defining a waveguide groove on a first side of the antenna block. The waveguide groove may comprise opposing walls that intermittently oscillate back and forth together, in some embodiments in a periodic manner. An antenna structure may be operably coupled with the waveguide groove and may be positioned and configured to deliver electromagnetic radiation from the waveguide groove therethrough. In some embodiments, the antenna structure may comprise one or more slots formed in the antenna block, which one or more slots may extend along a straight line, or at least substantially along a straight line, within the waveguide groove.

In some embodiments, the antenna structure may comprise a single, elongated slot extending within the waveguide groove. Alternatively, the antenna structure may comprise a plurality of adjacent slots extending within the waveguide groove.

In some embodiments, the waveguide groove may oscillate, at least in part, in an at least substantially sinusoidal pattern. In some such embodiments, the sinusoidal pattern or, in other embodiments, other oscillating pattern, may comprise an amplitude that tapers or otherwise changes along at least a portion of an axis of the waveguide groove.

In an example of an antenna module according to some embodiments, the module may comprise an antenna block defining a waveguide groove on a first side of the antenna block. The waveguide groove may extend along an elongated axis. An antenna structure may be operably coupled with the waveguide groove. In some embodiments, the antenna structure may comprise a single, elongated slot that intermittently oscillates back and forth along the elongated axis, such as in a periodic manner.

In some embodiments, the single, elongated slot may oscillate smoothly back and forth along the elongated axis. In some such embodiments, the single, elongated slot may oscillate in an at least substantially sinusoidal pattern.

Alternatively, the single, elongated slot may oscillate back and forth along the elongated axis in an at least substantially square wave pattern. The at least substantially sinusoidal pattern and/or square wave pattern may comprise an amplitude that tapers along the elongated axis or one that tapers along only a portion of the elongated axis.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

Figure 1A:
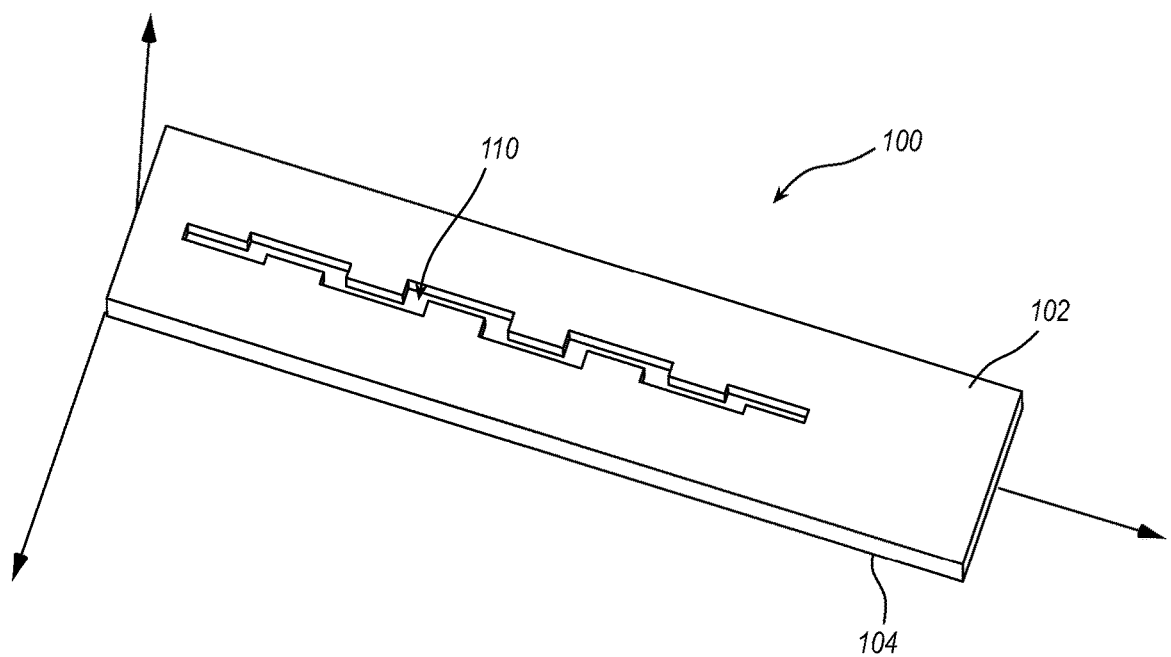
FIG. 1A is a perspective view of a combined waveguide and antenna structure according to some embodiments.
Figure 1B:
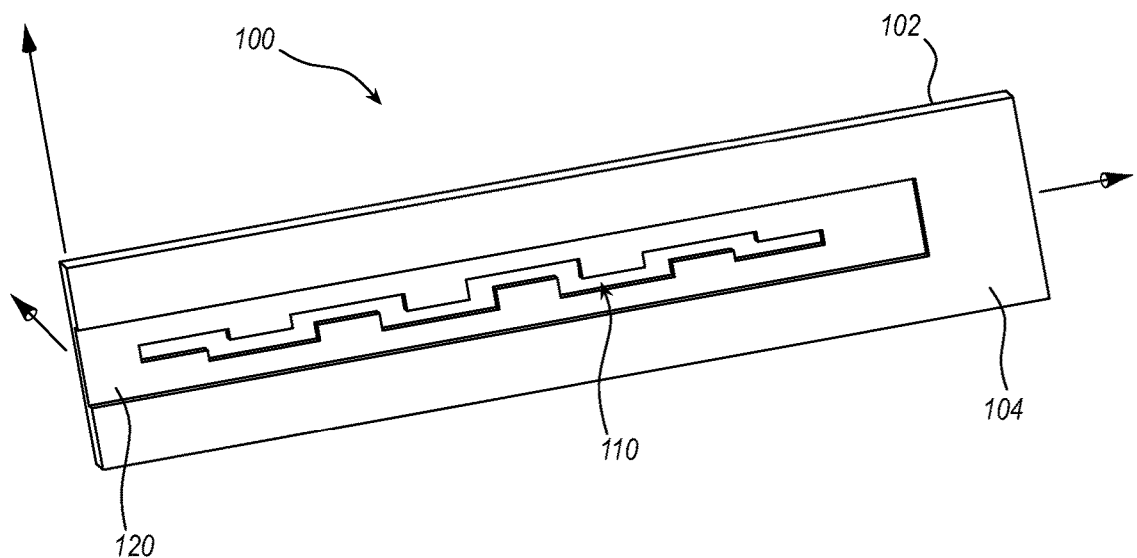
FIG. 1B is a perspective view of the waveguide and antenna structure of FIG. 1A shown from the opposite side.

FIGS. 1A and 1B depict an antenna and/or waveguide block 100 that defines, either in whole or in part, one or more waveguides therein and may comprise a portion of, for example, an antenna assembly, which antenna assembly may comprise one or more antennae, on one or both sides of waveguide block 100. Waveguide block 100 may therefore be incorporated into or otherwise used with a vehicle sensor, such as a RADAR sensor assembly, according to some embodiments.

Thus, as depicted in FIG. 1A, waveguide block 100 comprises an elongated slot 110 formed along a first side 102 of waveguide block 100. Slot 110 oscillates back and forth between opposing sides of an elongated axis. As shown in FIG. 1B, slot 110 is positioned within a rectangular-shaped waveguide groove 120 formed on a second side 104 opposite side 102. In the depicted embodiment, waveguide groove 120 is formed by opposing walls and extends along an elongated axis. In addition, although this need not be the case for other embodiments, in the depicted embodiment, slot 110 is centered within groove 120 and oscillates towards these opposing walls in an intermittent manner. It should be understood that, in alternative embodiments, a plurality of posts may be arranged in opposing rows to define a waveguide groove therebetween. Thus, waveguide grooves may be defined by forming grooves defined by continuous opposing walls or by a series of spaced posts, opposing rows of which may be define such grooves. In embodiments in which opposing rows of posts define the waveguide groove, a single groove may be defined by two opposing rows of posts (one row on each side) or, alternatively by a plurality of rows of posts on each side of each waveguide groove.

It should also be understood that any number of antennae may be provided and therefore any desired number of corresponding antennae structures—such as a plurality of waveguides, grooves, etc.—may be provided. However, some embodiments may comprise an array having a single antenna and therefore only a single waveguide. As described in greater detail elsewhere in this disclosure, the waveguides described herein may be defined in a variety of ways and may curve about the block/assembly rather than be in a series of parallel lines in some embodiments. As another example, in some embodiments, grooves, slots, or the like may be arranged in a disc formation, or any other suitable formation, including linear, curved, etc. In addition, it should also be understood that the accompanying figures depict only certain elements and/or aspects of antenna assemblies and/or waveguides and that, in order to properly function, other elements would typically need to be provided in a complete assembly/module having other functional elements that are not shown or described herein to avoid obscuring the disclosure.

In preferred embodiments, waveguide block 100 may comprise a casting, such as a casting comprising a Zinc or other suitable preferably metal material. However, in other contemplated embodiments, block 100 may instead, or in addition, comprise a plastic or other material. In some such embodiments, metallic inserts, coatings, or the like may be used if desired. In typical sensor assemblies, which, as previously mentioned, may be configured specifically for use in connection with vehicles, other structures may be combined with block/casting 100. For example, although the preferred embodiments disclosed herein comprise slots that are formed directly within block 100, alternative embodiments are contemplated in which such slots may be formed in a separate layer, in some cases along with other layers and/or elements that are not depicted herein to avoid obscuring the disclosure, to form an antenna and/or sensor assembly/module.

As also shown in FIGS. 1A and 1B, slot 110 is formed in a square-wave pattern in the depicted embodiment in which the aforementioned oscillation takes place in a stepwise manner having straight sides and sharp transitional edges. However, other embodiments are contemplated in which this oscillation may instead be smooth and/or define other types of patterns, such as sinusoidal or at least substantially sinusoidal patterns, for example.

In addition, although the amplitude of the oscillation shown in FIGS. 1A and 1B varies, in other embodiments this need not be the case. More particularly, the amplitude of the oscillation in the pattern of slot 110 increases towards a center of the pattern and then tapers in the opposite, decreasing direction towards the opposite end. However, again, this may vary as needed according to the specifications and prescribed uses for the waveguide and/or antenna structures described herein. Similarly, as described in connection with other embodiments, the waveguide groove 120 may oscillate as well, in some embodiments as an alternative to oscillating slot 110 or in addition to oscillating slot 110. Moreover, various other alternatives are contemplated, such as providing a series of spaced slots for the antenna of each waveguide rather than a single slot 110 as shown in FIGS. 1A and 1B. Similarly, such spaced slots may, but need not, oscillate.

Figure 2A:
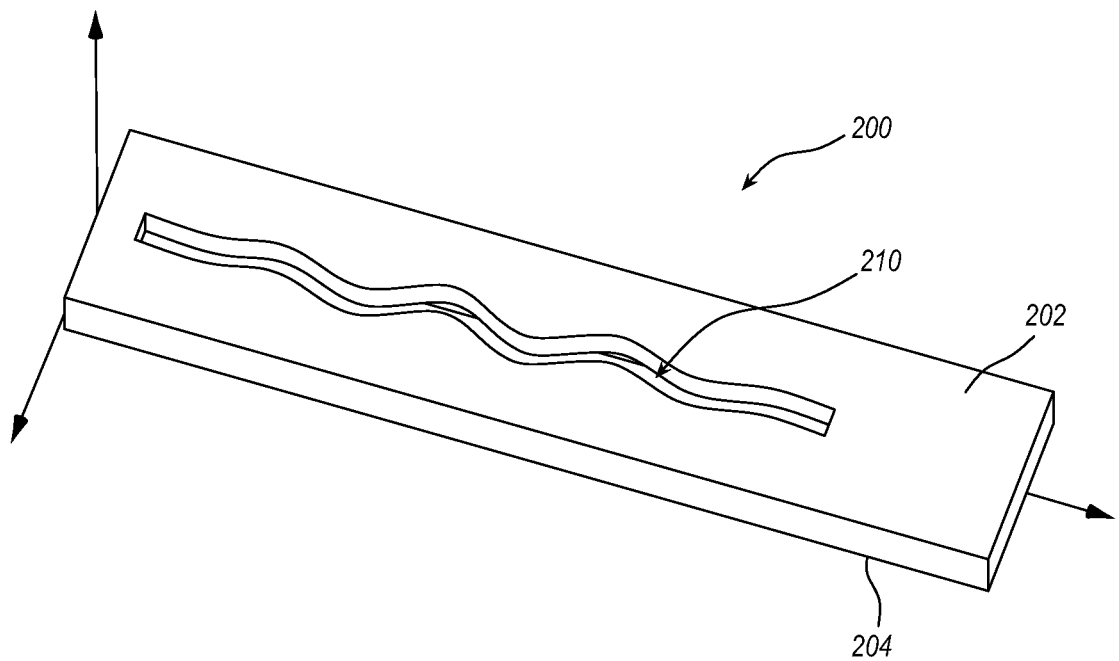
FIG. 2A is a perspective view of a combined waveguide and antenna structure according to other embodiments.
Figure 2B:
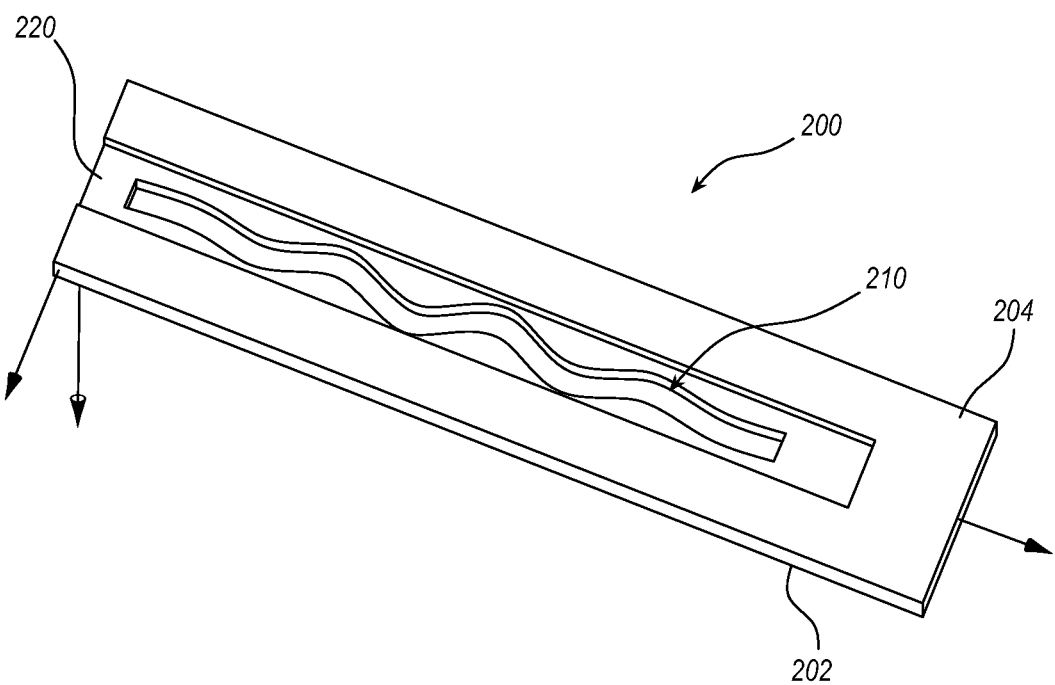
FIG. 2B is a perspective view of the waveguide and antenna structure of FIG. 2A shown from the opposite side.

FIGS. 2A and 2B illustrate an alternative embodiment of an antenna and/or waveguide block 200. Like block 100, block 200 comprises an antenna and/or waveguide block that defines, either in whole or in part, one or more waveguides therein and may comprise a portion of, for example, an antenna assembly, which may comprise one or more antennae, on one or both sides of waveguide block 200. However, unlike waveguide block 100, waveguide block 200 comprises a slot 210 that oscillates smoothly back and forth within waveguide groove 220. In the depicted embodiment, the oscillation pattern forms at least substantially a sinusoidal wave pattern. As with waveguide block 100, waveguide groove 220 of waveguide block 200 is formed along side 204 of block 200 opposite side 202 and elongated slot 210 is formed within and at least substantially centered within waveguide groove 220 and extends and opens at side 202 of waveguide block 200.

Figure 3A:
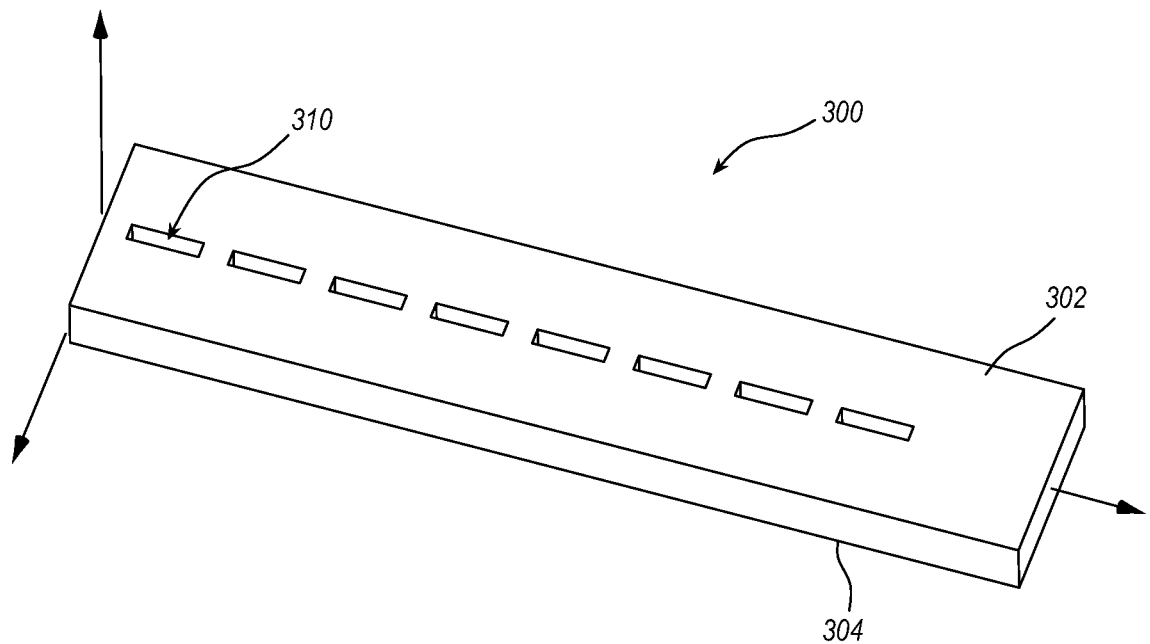
FIG. 3A is a perspective view of a combined waveguide and antenna structure according to still other embodiments.
Figure 3B:
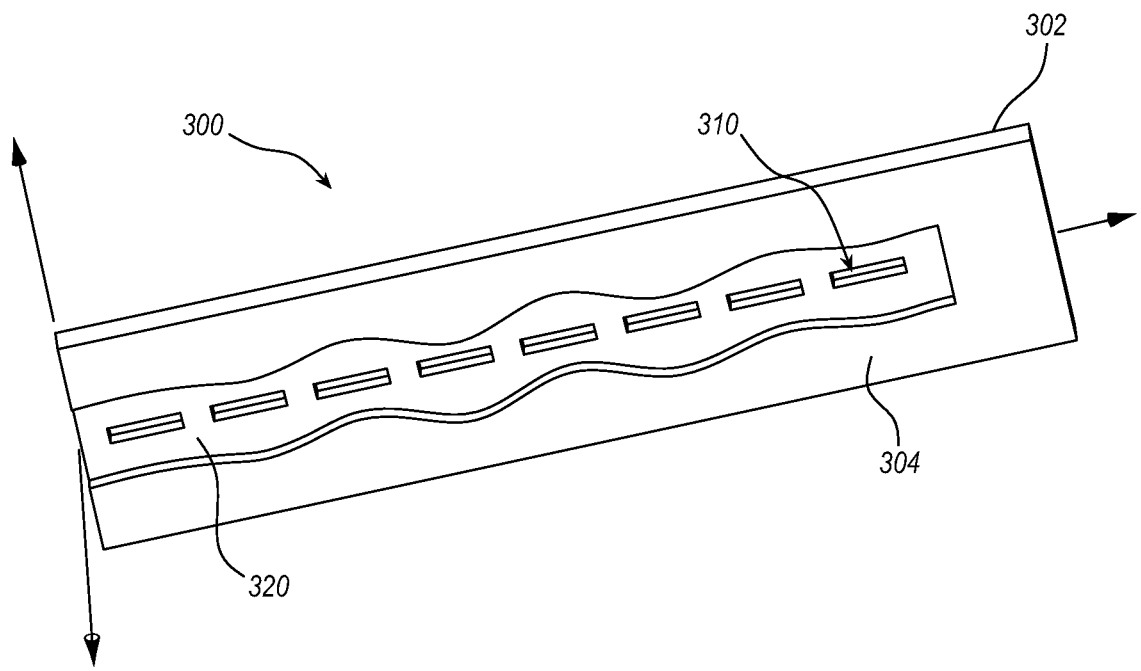
FIG. 3B is a perspective view of the waveguide and antenna structure of FIG. 3A shown from the opposite side.

Still another example of an alternative embodiment of an antenna and/or waveguide block 300 is depicted in FIGS. 3A and 3B. Block 300 also comprises an antenna and/or waveguide block that defines, either in whole or in part, one or more waveguides therein and may comprise a portion of an antenna assembly. However, unlike waveguide blocks 100 and 200, waveguide block 300 comprises an antenna structure defined by a plurality of spaced slots 310 opening at side 302 of block 300. Although slots 310 are positioned to extend within a straight line, other embodiments are contemplated in which this need not be the case.

For example, in some alternative contemplated embodiments, a plurality of antenna slots may be formed that extend along a curved or otherwise non-straight line. Such a non-straight pattern may be defined by, for example, curving the slots themselves and/or by providing straight slots that extend relative to adjacent slots in a non-straight pattern, if desired.

As another point of distinction vis-à-vis the embodiments previously depicted, block 300 comprises a waveguide groove 320 formed along side 304 that itself oscillates back and forth along an elongated axis. In the depicted embodiment, this oscillation is provided by oscillating both opposing sidewalls that define waveguide groove 320. However, it is contemplated that, in alternative embodiments, only one of the two opposing sidewalls may oscillate in this manner. It is also contemplated that, as previously mentioned in connection with the antenna slots, the sidewalls may meander/oscillate back and forth in a non-smooth manner, such as a stepwise manner and/or to define a square-wave pattern, if desired. In addition, although it may be preferred to provide an oscillation pattern in which both opposing sidewalls defining the waveguide groove oscillate together, or at least substantially together, as is the case with waveguide groove 320, it is also contemplated that, in other embodiments, the sidewalls may oscillate separately and/or in a non-synchronized manner in other embodiments.

Figure 4A:
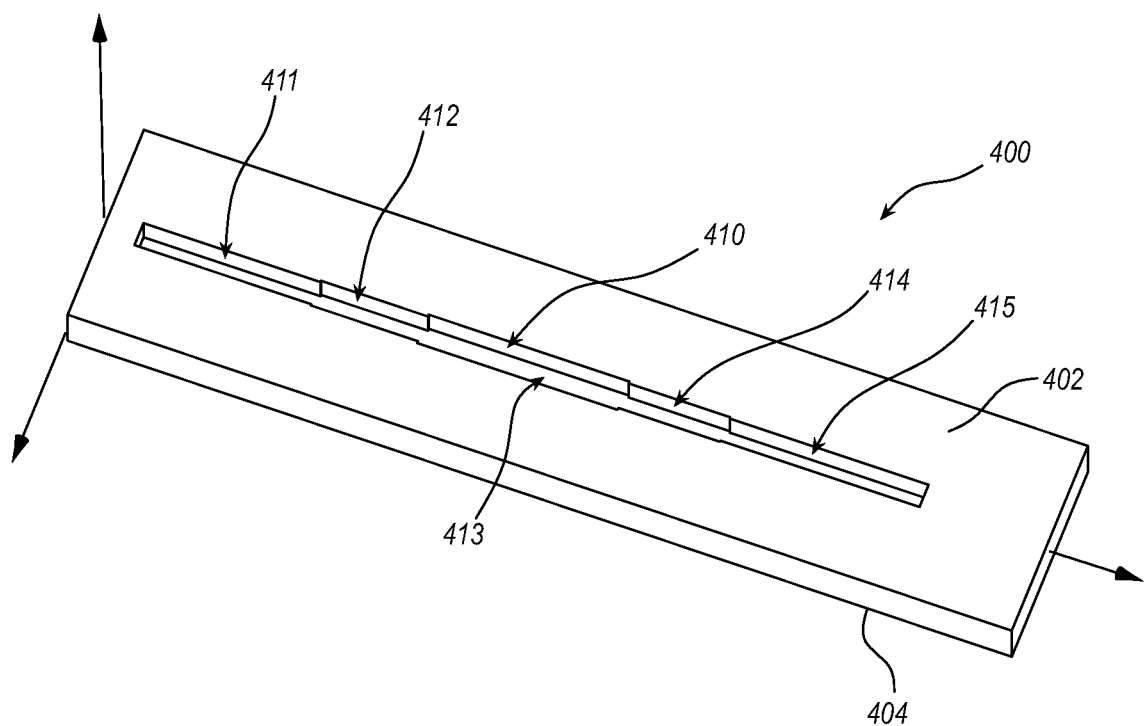
FIG. 4A is a perspective view of a combined waveguide and antenna structure according to further embodiments.
Figure 4B:
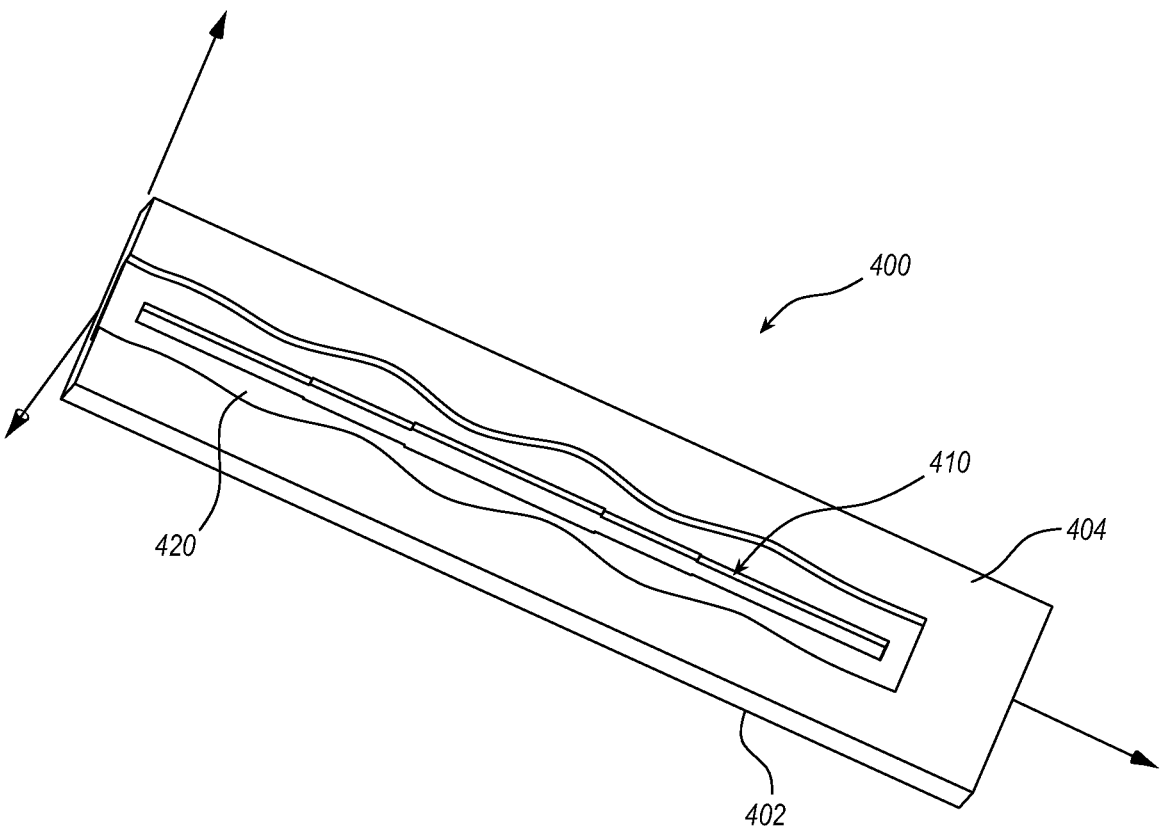
FIG. 4B is a perspective view of the waveguide and antenna structure of FIG. 4A shown from the opposite side.

Yet another example of an antenna and/or waveguide block 400 is depicted in FIGS. 4A and 4B. Again, block 400 comprises an antenna and/or waveguide block that defines, either in whole or in part, one or more waveguides therein and may comprise a portion of an antenna assembly. Like block 300, block 400 comprises a waveguide groove 420 formed along side 404 that oscillates back and forth by oscillating both opposing sidewalls that define waveguide groove 420.

However, unlike waveguide block 300, waveguide block 400 comprises an antenna structure defined by a single, elongated slot 410 opening at side 402 of block 400. Slot 410 is centered, or at least substantially centered, within groove 420, and at least substantially extends along a straight line.

Although alternative embodiments are contemplated in which slot 410 extends strictly along a straight line, in the depicted embodiment, slot 410 tapers in width slightly between its opposing ends. More particularly, this tapering results in opposing end sections 411 and 415 that are slightly thinner than adjacent sections 412 and 414, which, in turn, are slightly thinner than center section 413. Of course, a variety of other alternative will be apparent to those of ordinary skill in the art after having received the benefit of this disclosure. For example, in some alternative embodiments, the tapering may be smooth rather than providing steps/ridges as shown in FIGS. 4A and 4B. Similarly, any alternative number of tapering sections may be provided (or none at all, as previously mentioned). Similarly, in some embodiments, the tapering may only be in one direction rather than bi-directional as shown in these figures and/or may be in the opposite direction(s) shown in the figures (e.g., larger width at the ends).

Similarly, it should be understood that slots and/or waveguide grooves may be curved but still extend along the axis of the associated waveguide without oscillating in the manner previously mentioned. For example, in order to conserve space, in some embodiments, a plurality of waveguides may be formed on a single structure and/or assembly that may curve or otherwise be angled towards a hub or the like having various electrical components used to generate, receive, and/or process signals. One or more portions of such waveguides, such as the antenna slots or the waveguide grooves themselves, for example, may follow this curvature/movement either without oscillating, in which case they may be considered to extend straight or along the axis of the waveguide, or may oscillate, curve, or otherwise extend back and forth vis-à-vis the axis of the waveguide as previously mentioned. Also, although it may be preferred to form the waveguide groove and the antenna slots in the same block/structure, as shown in the accompanying figures, in alternative embodiments, these components may be formed in separate layers or otherwise in separate structures of the corresponding RADAR assembly, other sensor assembly, or another component of an assembly comprising an electromagnetic waveguide.

In embodiments in which a separate slotted layer is used, preferably this layer comprises a metal or other conductive material, which may be similar or identical to the material used to form the adjacent, operably coupled waveguides. Such a slotted layer may be coupled with the block/waveguide(s) in a variety of possible ways. For example, an adhesive, solder, epoxy, heat stakes, screws, other fasteners, and the like may be used to couple the slotted layer to the block. Similar structures and/or techniques may be used to couple other layers or other elements of the assembly together, such as coupling the casting to a substrate and/or PCB, for example. In some embodiments, another layer, such as a layer of (preferably conductive) adhesive tape, may be inserted in between the block and the slotted layer, which may, either entirely or in part, be used to provide this coupling.

Similarly, in some embodiments, electromagnetic signal confinement structures may be provided with the waveguide(s). For example, in some embodiments, an assembly incorporating the waveguide(s) may comprise a PCB and/or substrate, which may comprise one or more layers and/or functional elements that may be used to confine and/or prevent or at least reduce unwanted leakage of electromagnetic energy and/or signals within the waveguide. In some embodiments, the substrate/PCB may comprise one or more metallic/conductive layers and/or coatings coupled thereto. EM signal confinement structures may be incorporated into such a substrate, preferably along both sides of one or more of the waveguides.

In some embodiments, these confinement structures comprise periodic structures operably coupled to the waveguide that define a zipper-like shape. More particularly, these periodic structures may comprise an elongated opening or slot that preferably extends along a line that may run parallel, or at least substantially parallel, to the adjacent waveguide along one or both sides thereof. This structure may be formed in a metallic/conductive layer and/or coating that is positioned immediately adjacent to the block or other structure within which the waveguide or waveguides are formed. The zipper-like confinement structure may be defined by a first series of repeated slots formed along one side of an elongated opening defining the axis of the structure and a second series of repeated slots formed along the opposite side of this opening, both of which may extend into and be directly coupled with the elongated opening. In some embodiments, the aforementioned opposing slots may be aligned with one another.

Each of the aforementioned openings/slots may extend into a widened dielectric chamber. In some embodiments, one surface of the substrate/PCB may comprise a pair of parallel resonant cavities or chambers, one extending along and/or adjacent to each side of the waveguide groove(s). These chambers may extend parallel, or at least substantially parallel, to the waveguide groove(s) in some embodiments. Preferably, these chambers comprise dielectric chambers. In other words, these chambers may be made up of a dielectric material, such as, for example, a glass fiber reinforced (fiberglass) epoxy resin material or the like, a thermoplastic material, or a ceramic material. In some contemplated embodiments, the dielectric chambers may be empty and therefore may be occupied only by air. Another metallic/conductive layer may be coupled to the substrate/PCB layer comprising the signal confinement structures, which may serve as a ground layer for the assembly.

In other embodiments, a periodic signal confinement structure may comprise a mushroom structure or other structure, such as an electromagnetic band-gap (EBG) structure, as those of ordinary skill in the art will appreciate. As another example, in some embodiments, a substrate integrated waveguide (SIW) may be used as part of the assembly, which may be formed in a dielectric substrate by placing metallized posts or via-holes along opposing sides of the waveguide.

Figure 5:
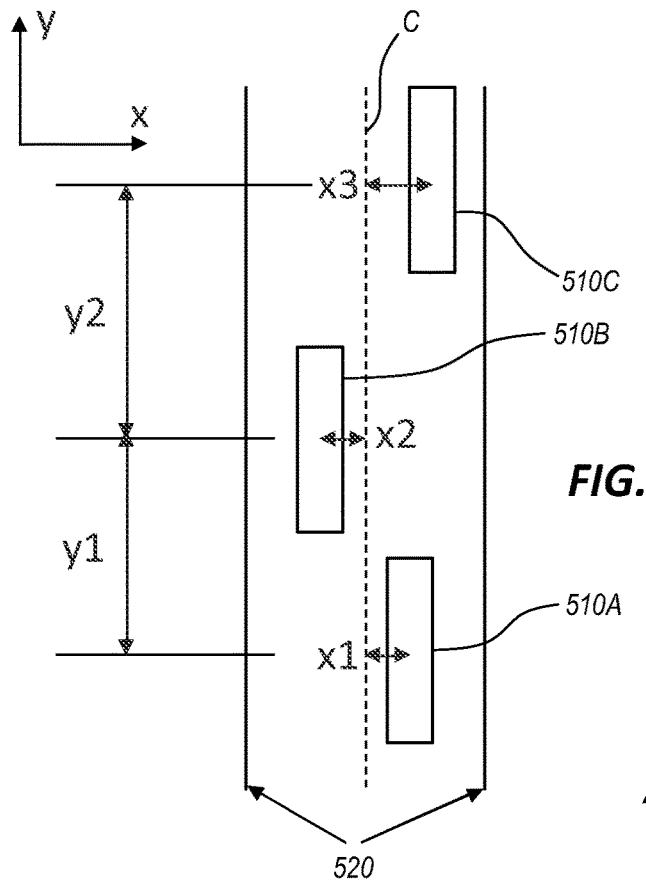
FIG. 5 is a schematic diagram illustrating how parameters in the design of a waveguide with antenna slots may be used to adjust performance.

FIG. 5 is a schematic diagram of a waveguide and antenna slot assembly comprising a waveguide 520 and antenna slots 510A, 510B, and 510C. This diagram illustrates how various design parameters may be used to tune desired performance. For example, the distance of each slot 510A/510B/510C from the center line C of waveguide 520 (distances X1, X2, and X3) may determine how much energy is coupled to each slot. The larger the offset in X distance the more energy couples to the slots. If a slot is placed in the middle of the waveguide 520 (i.e., along the center line C), it would not radiate. It is a design parameter and can be different for each slot. This allows the design to control the amplitude along the length of the antenna aperture, which may improve radiation pattern shape (reducing sidelobes, for example).

Similarly, the vertical distance between each slot 510A/510B/510C and the adjacent slot (distances Y1 and Y2, for example) allows the designer to optimize the phase relationship between slots. For antenna to transmit at broadside all slots should preferably be in phase. In addition, the length (in y) and the width (in x) of each slot can be a variable that affects both amplitude and phase for each slot 510A/510B/510C.

Figure 6:
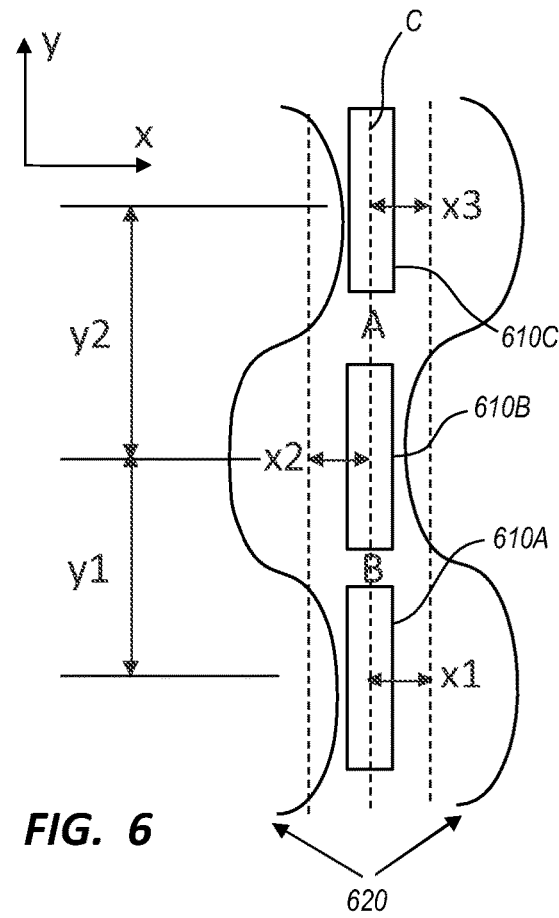
FIG. 6 is another schematic diagram illustrating how oscillating and/or curved waveguide walls may be used to provide equivalent performance without having multiple antenna slots.

FIG. 6 similarly schematically illustrates how configuring the opposing walls of waveguide 620 to oscillate in a curved manner may be useful. The amplitude of "oscillation" of each slot 610A/610B/610C (distances X1, X2, and X3) determines how much energy is coupled to each slot. It is a design parameter and can be different for each slot. Similarly, the period of oscillation may affect the phase of each slot. There may not be a complete period in the design as distances Y1 and Y2 between the centers of each adjacent slot can be different. This allows the designer to optimize the phase relationship between slots. Finally, the length (in y) and the width (in x) of each slot 610A/610B/610C can be a variable that affects both amplitude and phase for each slot. If the slots are connected into a single, elongated slot rather than spaced slots then some degrees of freedom are lost, although the overall width of the slot and its length are still design parameters. Placing the slot or slots along, or at least substantially along, a centerline of the waveguide may be useful to reduce cross-polarization.

However, one, elongated slot can be easier to manufacture than many small ones, and making the opposing sidewalls to oscillate/curve, as shown in FIG. 6, may allow for use of a single, elongated slot instead of the spaced slots 610A/610B/610C shown in the figure. Without being limited by theory, the inventors believe this is the case because, at points A and B, the walls of the waveguide 620 are equidistant from the center line C. Thus, by placing a slot at points A and B it would not radiate. One can therefore connect all the adjacent slots together and the in-between sections would not radiate.

They would act as if they were closed. Thus, a single elongated slot may be treated as equivalent to a series of "virtual" slots in this manner.

Figure 7:
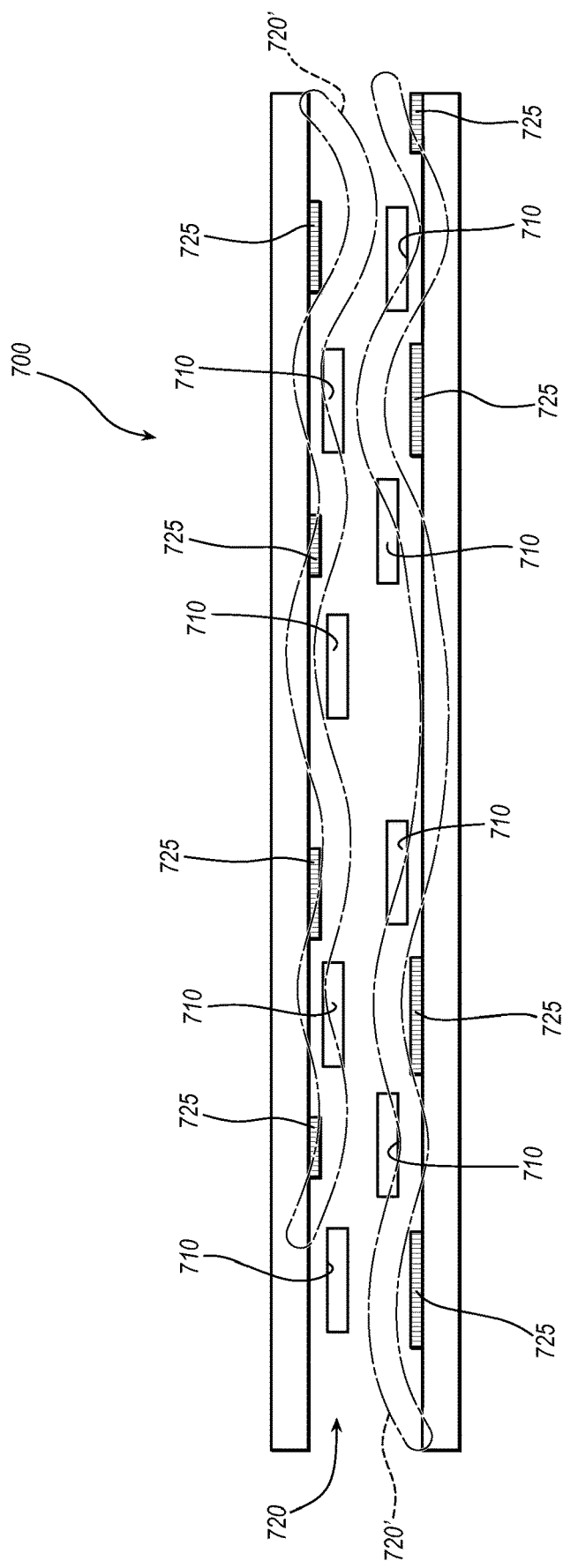
FIG. 7 is a plan view of a combined waveguide and antenna structure utilizing projecting members within the waveguide.

FIG. 7 illustrates another example of a combine waveguide and antenna assembly or structure 700. Structure 700 again comprises an antenna and/or waveguide block that defines, either in whole or in part, one or more waveguides 720 therein and may comprise a portion of an antenna assembly. However, unlike the previously-depicted structures, assembly/structure 700 comprises a waveguide groove 720 that oscillates back and forth by providing a series of obstacles or protruding members 725 that may be strategically positioned within waveguide groove 720 rather than oscillating the opposing sidewalls that define waveguide groove 720, as was the case with several previous embodiments.

Protruding members 725 are preferably positioned along a side of waveguide groove 720 opposite that of the adjacent slots 710, which slots 710 may be formed in the same structure or an adjacent structure. Thus, as shown in FIG. 7, most of the slots 710 (in some embodiments, each slot) are positioned opposite from an obstacle/protruding member 725, which may serve a similar function to providing wavy sidewalls but may be easier to manufacture. Protruding members 725 may be positioned adjacent to each sidewall of waveguide groove 720. In some cases, protruding members 725 may be positioned immediately adjacent thereto with no space in between the sidewall and the protruding members 725, as shown in the figures. Alternatively, they may be placed adjacent to the sidewalls with a relatively small amount of space in between. Similarly, protruding members 725 may be the same height as the adjacent sidewalls or may be shorter than the adjacent sidewalls if desired. In addition, it should be understood that, in some embodiments, the sidewalls may jut back and forth rather than putting in separate obstacles/protruding members 725 if desired. A roughly equivalent waveguide to that provided by including the obstacles/protruding members 725 is illustrated at 720', which illustrates a possible curvature to the waveguide groove itself rather than including the obstacles/protruding members 725. It should be understood that slots may be positioned to extend within a straight line as in other, previously described embodiments. The asymmetry regarding the field inside the waveguide may be present due to the obstacles or protruding members 725.

Figure 8A:
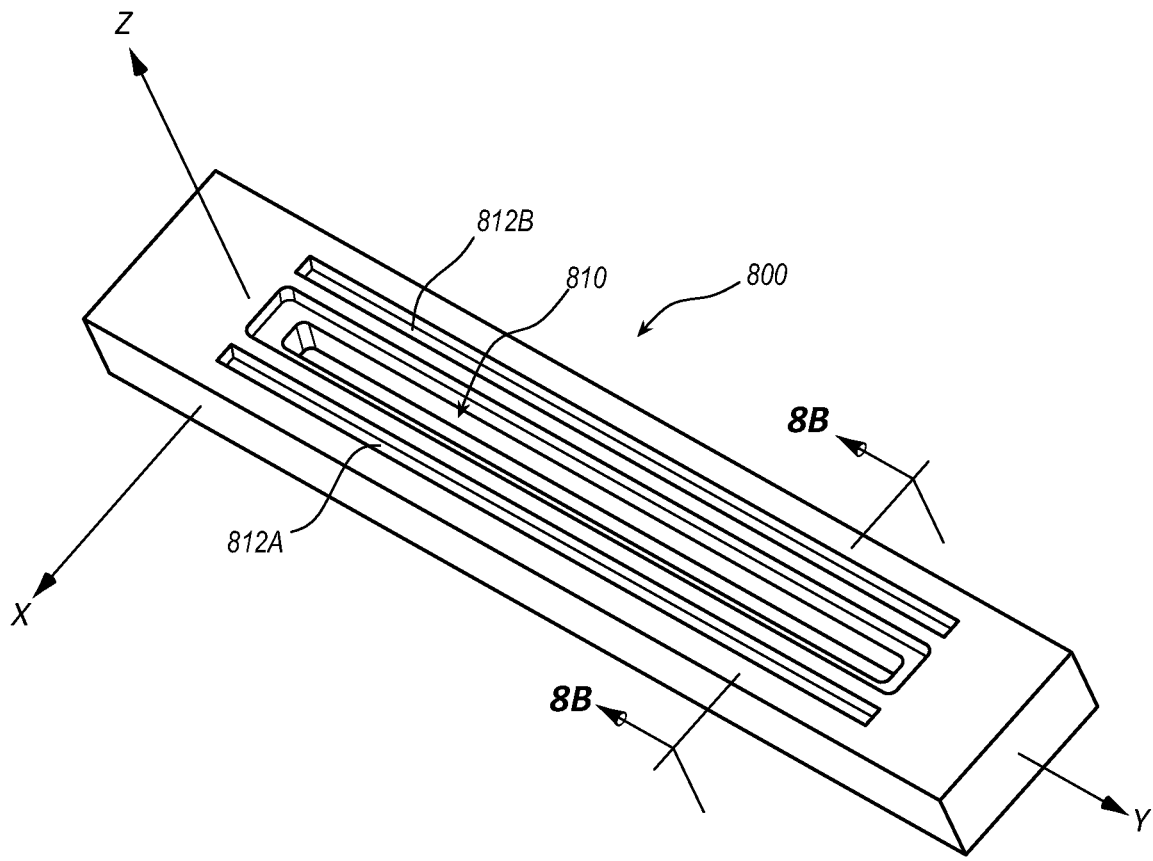
FIG. 8A is a perspective view of a combined waveguide and antenna structure illustrating an alternative design for antenna slots.
Figure 8B:
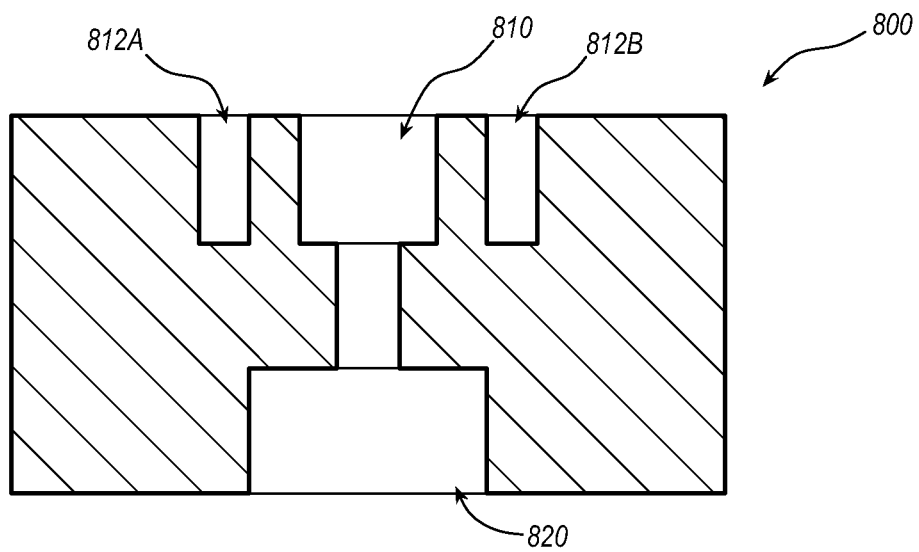
FIG. 8B is a cross-sectional view taken along line 8B-8B in FIG. 8A.

Yet another example of a combined waveguide and antenna structure 800 is shown in FIGS. 8A and 8B. As shown in these figures, structure 800 again comprises a waveguide groove 820 and an elongated slot 810. However, slot 810 differs from those previously depicted in that it comprises a widened portion or groove and two adjacent grooves 812A and 812B, which may be used to narrow the azimuth antenna pattern by acting as a focusing mechanism in the azimuth plane.

Figure 9A:
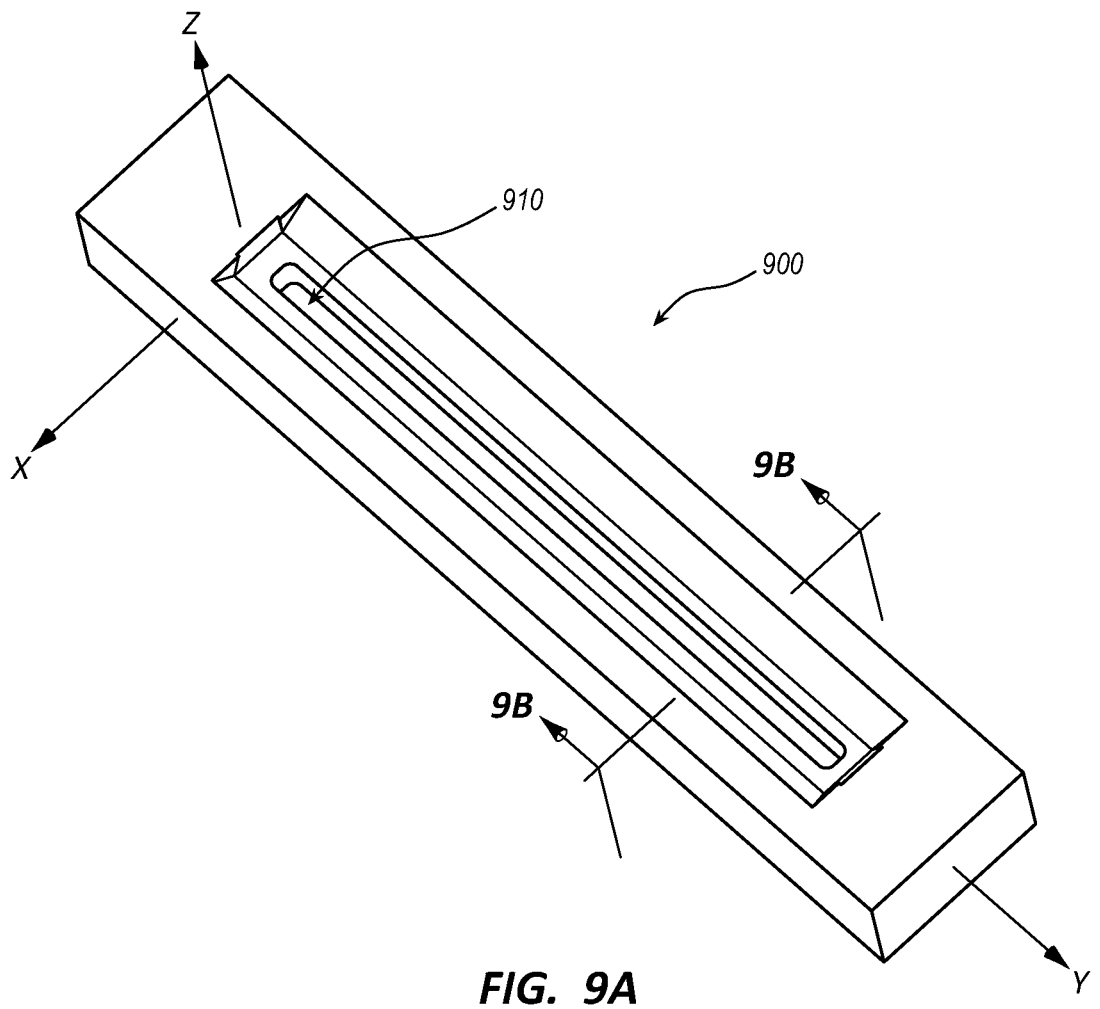
FIG. 9A is a perspective view of a combined waveguide and antenna structure illustrating another alternative design for antenna slots.
Figure 9B:
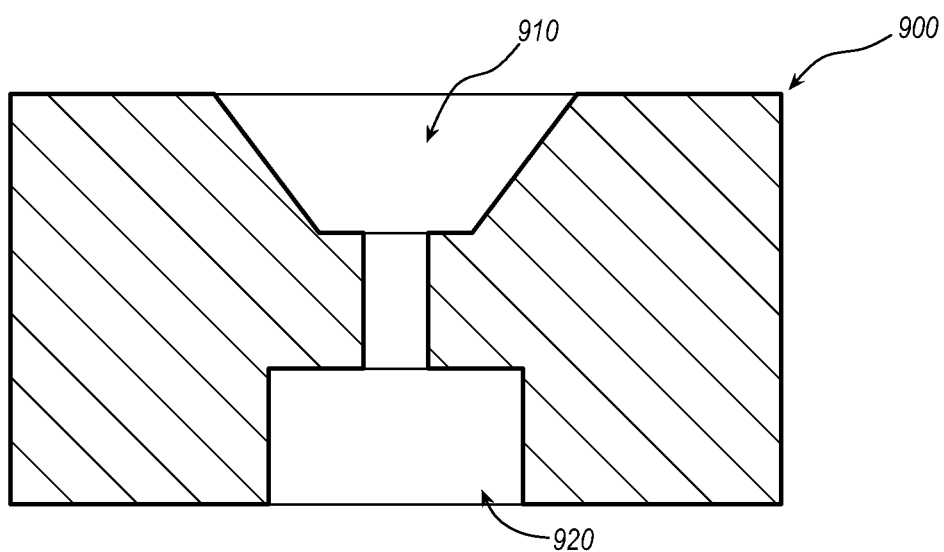
FIG. 9B is a cross-sectional view taken along line 9B-9B in FIG. 9A.

Similarly, in the embodiment of a combined waveguide an antenna structure 900 of FIGS. 9A and 9B, a horn structure is positioned adjacent to antenna slot 910 opposite waveguide groove 920 to focus the azimuth pattern by, in effect, enlarging the width of the aperture. Thus, as illustrated in FIG. 9B, the sidewalls of the enlarged region of slot 910 are angled so as to define an opening on that side that gets larger towards the side of structure 900 opposite waveguide 920.

Figure 10A:
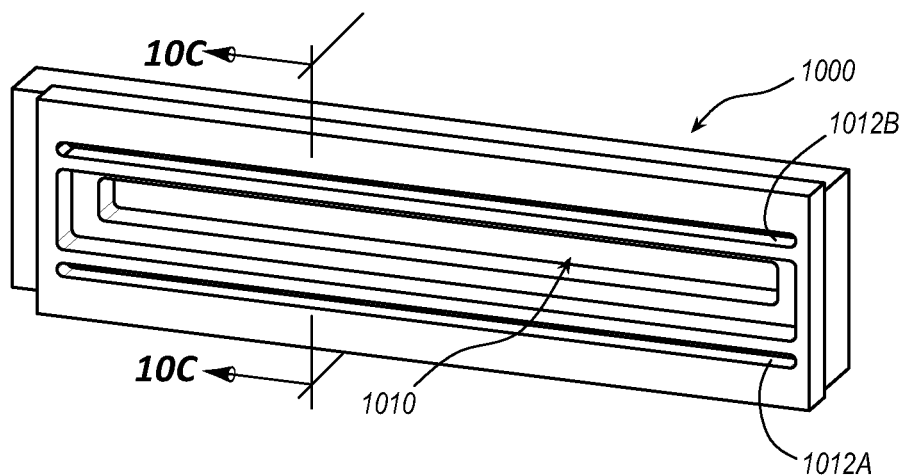
FIG. 10A is a perspective view of a combined waveguide and antenna structure according to skill other embodiments.
Figure 10B:
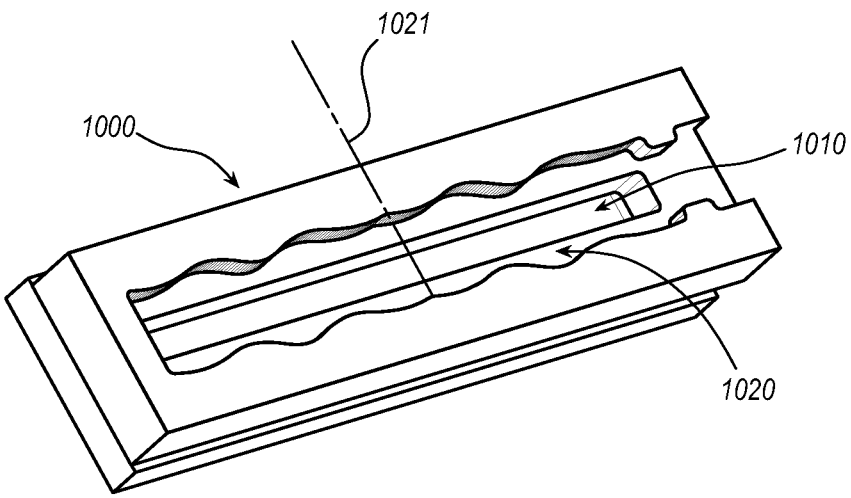
FIG. 10B is a perspective view of the combined waveguide and antenna structure of FIG. 10A from an opposite side illustrating a meandering waveguide groove having two portions at least substantially symmetrical to one another.
Figure 10C:
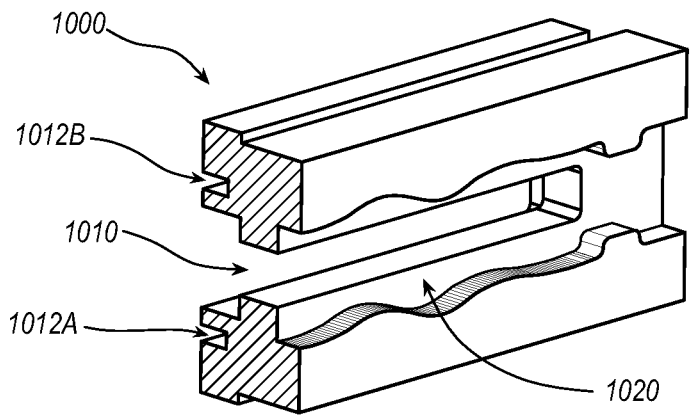
FIG. 10C is a cross-sectional view taken along line 10C-10C in FIG. 10A.

Still another example of a combined waveguide and antenna structure 1000 is shown in FIGS. 10A-10C. As shown in these figures, structure 1000 also comprises a waveguide groove 1020 and an elongated antenna slot 1010. Like structure 800, slot 1010 comprises a widened portion or groove within which slot 1010 is positioned on one side of the structure and two adjacent grooves 1012A and 1012B formed on the same side. Again, these side/adjacent grooves 1012A/1012B may be used to narrow the azimuth antenna pattern by acting as a focusing mechanism in the azimuth plane.

In addition, as shown in FIG. 10B and the cross-sectional view of FIG. 10C, the opposite side of structure 1000 comprises a waveguide groove 1020 that oscillates back and forth along an elongated axis, which oscillation may be periodic or at least quasi-periodic in some embodiments. In the depicted embodiment, this oscillation is provided by oscillating both opposing sidewalls that define waveguide groove 1020. Again, in alternative embodiments, only one of the two opposing sidewalls may oscillate in this manner and/or the sidewalls may meander/oscillate in other ways, such as by providing one or more sharp transitional regions rather than the smoothly curving walls of the depicted embodiment.

In addition, the waveguide groove 1020 of structure 1000 differs from those of other embodiments in that the pattern of the waveguide groove 1020 is symmetrical about line 1021, which in the depicted embodiment is at, or at least substantially at, the center of the waveguide. By providing a shape that is symmetrical, or at least substantially symmetrical, in this manner, a phase change in the antenna output of the structure and/or an associated sensor/waveguide assembly may be provided, which may be useful in causing the output to resemble a double-pole antenna, which may be useful in a variety of contemplated applications/embodiments.

It should also be noted that, in addition to being symmetrical about line 1021, waveguide groove 1020 forms a discontinuity at the point along the waveguide groove 1020. In other words, the waveguide groove 1020 essentially forms two waveguide grooves, that preferably but not necessarily have the same shape (reflectionally) and extend in opposite directions at 1021. It can also be seen in the figures that the waveguide groove 1020 forms a sharp point of discontinuity rather than a smoothly curving portion although, once again, this need not be the case in all contemplated embodiments.

As those of ordinary skill in the art will appreciate, antenna/waveguide/sensor assemblies incorporating the waveguide/antenna structures described herein may further comprise a PCB or other electromagnetic-generating element from which electromagnetic waves may be generated to feed one or more waveguide structures. These elements may be provided in a separate layer or, alternatively, may be provided in the same layer.

It should also be understood that, whereas the block structures shown in the accompanying figures are generally shown with a single groove, which may be thought of as providing a single "antenna" when coupled with one or more adjacent slots, any number of waveguide grooves and/or adjacent slot and/or antenna structures may be provided as desired, and each such waveguide and/or waveguide groove may be associated with a different antenna of the antenna block.

It should also be understood that whereas preferred embodiments may be used in connection with vehicle sensors, such as vehicle RADAR modules or the like, the principles disclosed herein may be used in a wide variety of other contexts, such as other types of RADAR assemblies, including such assemblies used in aviation, maritime, scientific applications, military, and electronic warfare. Other examples include point-to-point wireless links, satellite communication antennas, other wireless technologies, such as 5G wireless, and high-frequency test and scientific instrumentation. Thus, the principles disclosed herein may be applied to any desired communication sub-system and/or high-performance sensing and/or imaging systems, including medical imaging, security imaging and stand-off detection, automotive and airborne radar and enhanced passive radiometers for earth observation and climate monitoring from space.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present inventions should, therefore, be determined only by the following claims.

The invention claimed is:

1. A waveguide assembly, comprising:
a waveguide groove extending along an elongated axis; and
an antenna structure operably coupled with the waveguide groove and comprising a continuous, elongated slot extending within the waveguide groove along the elongated axis, wherein the antenna structure is positioned and configured to deliver electromagnetic radiation from the waveguide groove therethrough, and wherein at least one of the waveguide groove and the continuous, elongated slot of the antenna structure intermittently oscillates on opposite sides of the elongated axis along at least a portion of the elongated axis.

2. The waveguide assembly of claim 1, wherein the at least one of the waveguide groove and the continuous, elongated slot of the antenna structure intermittently oscillates on opposite sides of the elongated axis in a periodic manner along at least a portion of the elongated axis.

3. The waveguide assembly of claim 2, wherein the at least one of the waveguide groove and the continuous, elongated slot of the antenna structure intermittently oscillates on opposite sides of the elongated axis in a pattern that smoothly curves between opposite sides of the elongated axis.

4. The waveguide assembly of claim 3, wherein the pattern is at least substantially a sinusoidal pattern.

5. The waveguide assembly of claim 1, wherein the waveguide groove intermittently oscillates on opposite sides of the elongated axis in a periodic manner along at least a portion of the elongated axis, and wherein the waveguide groove comprises a plurality of protruding members positioned adjacent to opposing walls of the waveguide groove.

6. The waveguide assembly of claim 5, wherein the antenna structure comprises a single, elongated slot that extends in at least substantially a straight line along the elongated axis within the waveguide groove.

7. The waveguide assembly of claim 6, wherein the single, elongated slot is at least substantially centered with respect to the waveguide groove.

8. The waveguide assembly of claim 5, wherein an amplitude of a periodic pattern defined by the waveguide groove tapers along the elongated axis.

9. The waveguide assembly of claim 1, wherein the waveguide assembly comprises a waveguide block, wherein the waveguide groove is formed in the waveguide block, wherein the waveguide groove is defined by one or more opposing rows of posts, and wherein the continuous, elongated slot is formed in the waveguide block.

10. An antenna module, comprising:
an antenna block defining a waveguide groove on a first side of the antenna block, the waveguide groove comprising opposing walls that intermittently oscillate; and
an antenna structure operably coupled with the waveguide groove, wherein the antenna structure is positioned and configured to deliver electromagnetic radiation from the waveguide groove therethrough, wherein the antenna structure comprises one or more slots formed in the antenna block, and wherein the one or more slots extends at least substantially along a straight line within the waveguide groove.

11. The antenna module of claim 10, wherein the antenna structure comprises a single, elongated slot extending within the waveguide groove.

12. The antenna module of claim 10, wherein the antenna structure comprises a plurality of adjacent slots extending within the waveguide groove.

13. The antenna module of claim 10, wherein the waveguide groove oscillates, at least in part, in an at least substantially sinusoidal pattern.

14. The antenna module of claim 13, wherein the sinusoidal pattern comprises an amplitude that tapers along an axis of the waveguide groove.

15. The antenna module of claim 10, wherein the waveguide groove comprises a point along the waveguide groove measured along a longitudinal axis thereof, wherein the waveguide groove defines a shape having reflectional symmetry along the longitudinal axis about the point.

16. An antenna module, comprising:
an antenna block defining a waveguide groove on a first side of the antenna block, the waveguide groove extending along an elongated axis; and
an antenna structure operably coupled with the waveguide groove, the antenna structure comprising a single, elongated slot that intermittently oscillates back and forth along the elongated axis, wherein the antenna structure is positioned and configured to deliver electromagnetic radiation from the waveguide groove therethrough.

17. The antenna module of claim 16, wherein the single, elongated slot oscillates smoothly back and forth along the elongated axis.

18. The antenna module of claim 17, wherein the single, elongated slot oscillates in an at least substantially sinusoidal pattern.

19. The antenna module of claim 18, wherein the at least substantially sinusoidal pattern comprises an amplitude that tapers along the elongated axis.

20. The antenna module of claim 16, wherein the single, elongated slot oscillates back and forth along the elongated axis in an at least substantially square wave pattern.

21. The antenna module of claim 20, wherein the at least substantially square wave pattern comprises an amplitude that tapers along the elongated axis.

22. The antenna module of claim 16, wherein the single, elongated slot is formed in the antenna block.

\* \* \* \* \*